United States Patent
Shipman

(10) Patent No.: US 8,585,263 B2
(45) Date of Patent: Nov. 19, 2013

(54) ILLUMINATED VEHICULAR SIGN

(76) Inventor: Michael Shipman, Newport Beach, CA (US)

( * ) Notice: Subject to any disclaimer, the term of this patent is extended or adjusted under 35 U.S.C. 154(b) by 0 days.

(21) Appl. No.: 13/385,697

(22) Filed: Mar. 2, 2012

(65) Prior Publication Data

US 2012/0224383 A1    Sep. 6, 2012

Related U.S. Application Data

(60) Provisional application No. 61/464,515, filed on Mar. 4, 2011.

(51) Int. Cl.
*B60Q 1/00*    (2006.01)

(52) U.S. Cl.
USPC ........... 362/493; 362/479; 362/496; 362/540; 340/472

(58) Field of Classification Search
USPC ........ 362/84, 97.3, 249.01, 249.02, 479, 496, 362/540, 555, 612–613, 800, 183, 227, 232, 362/238, 240, 243, 493, 542–546, 802, 362/812; 40/541–544, 550–553, 556, 591; 340/6.1, 468, 471, 472, 815.4, 815.45, 340/902
See application file for complete search history.

(56) References Cited

U.S. PATENT DOCUMENTS

| | | | | |
|---|---|---|---|---|
| 1,192,982 A * | 8/1916 | Bristol et al. | | 40/552 |
| 1,373,167 A * | 3/1921 | Brooks | | 40/551 |
| 2,891,140 A | 6/1959 | Huff | | |
| 4,028,828 A * | 6/1977 | Chao et al. | | 40/552 |
| 4,426,028 A | 1/1984 | Bott | | |
| 4,645,970 A * | 2/1987 | Murphy | | 313/509 |
| 4,879,826 A * | 11/1989 | Wittke | | 40/551 |
| 5,211,466 A | 5/1993 | Jarocki et al. | | |
| 5,255,164 A | 10/1993 | Eidelman | | |
| 5,884,997 A * | 3/1999 | Stanuch et al. | | 362/493 |
| 5,934,797 A | 8/1999 | Schlaudroff et al. | | |
| 6,081,191 A * | 6/2000 | Green et al. | | 340/472 |
| 6,735,893 B2 * | 5/2004 | Wolf | | 40/591 |
| 7,118,239 B2 | 10/2006 | Itoh et al. | | |
| 7,121,700 B1 * | 10/2006 | Scanlon | | 362/493 |
| 7,467,486 B2 * | 12/2008 | Kaoh | | 40/551 |
| 7,468,677 B2 * | 12/2008 | Pederson et al. | | 340/815.45 |
| 7,621,662 B1 | 11/2009 | Colbert | | |
| 7,635,209 B2 | 12/2009 | Uematsu et al. | | |
| 7,825,790 B2 * | 11/2010 | Tallinger | | 340/472 |
| 7,931,393 B2 * | 4/2011 | Stempinski | | 362/496 |
| 2002/0171542 A1 * | 11/2002 | Bloomfield et al. | | 340/464 |
| 2004/0227370 A1 * | 11/2004 | Bader et al. | | 296/37.7 |
| 2004/0260470 A1 * | 12/2004 | Rast | | 701/300 |
| 2005/0018441 A1 | 1/2005 | Menke et al. | | |
| 2006/0072303 A1 * | 4/2006 | Dunkle et al. | | 362/84 |
| 2007/0008093 A1 * | 1/2007 | Nigro et al. | | 340/436 |
| 2009/0116257 A1 * | 5/2009 | Rosemeyer et al. | | 362/493 |

FOREIGN PATENT DOCUMENTS

WO    WO2010/099531    9/2010

* cited by examiner

*Primary Examiner* — Hargobind S Sawhney
(74) *Attorney, Agent, or Firm* — David G. Duckworth; Russo & Duckworth, LLP

(57) ABSTRACT

An illuminated vehicular sign is provided including a vehicle and luminescent planar sheet. The luminescent planar sheet is constructed to provide illuminated alpha-numeric characters which are mounted to the horizontal planar surfaces of a vehicle. The alpha-numeric characters are mounted substantially horizontally so as to be seen from the air such as by helicopters or planes.

7 Claims, 6 Drawing Sheets

ILLUMINATED VEHICULAR SIGN

RELATED APPLICATIONS

The present application is a continuation-in-part application of co-pending U.S. Patent Application Ser. No. 61/464,515 filed on Mar. 4, 2011.

BACKGROUND OF THE INVENTION

The present invention relates to indicia that can be affixed on top of the horizontal planar surfaces of emergency response vehicles such as fire department vehicles, police cars and ambulances to provide visibility from above.

Most conventional emergency response vehicles provide audible alert warnings and visual alert warnings such as sequenced flashing of head, tail and side light assemblies, or a roof mounted light bar containing at least one light source designed to disburse light in 360 degrees. These lights may be solid, stroboscopic, revolving, flashing, modulated, pulsing, oscillating, alternating, or any combination thereof. Thus, these light systems are designed primarily for viewing from the front, rear, or side of emergency response vehicles.

While in most situations, any of the aforementioned devices would suffice in alerting a passerby of the presence of the emergency response vehicle, there are crucial situations in which greater visibility is required. For example, in the case of vehicular pursuits, helicopter units are often called for service to help ground units observe and track pursuits as well as ensure public safety while in pursuit. Helicopters provide valuable service to law enforcement in general and, more particularly, to the pursuit function. Helicopter units can assist ground units as a platform from which to observe, track and illuminate people or places on the ground. Moreover, the helicopter units serve as backup to ground units, and the helicopter flight crews can provide a perspective that cannot be achieved on the ground. Further, they can communicate with ground units and provide information to direct them toward an intended position or away from a dangerous one. In addition, the helicopter units can provide crucial information, such as reporting whether or not suspects were carrying weapons, etc.

There is a need for a system to assist helicopter units in distinguishing ground units and their positioning with their brightly illuminated numerals affixed on the roof of ground units. Currently, many police vehicles already have numerals illustrated on top of their roofs. These numerals are used to differentiate the police vehicle from other vehicles and to help identify the police district, the unit and the individual. However, typically, these numerals are in plain black text and are not illuminated. Therefore, when there is little or no light, it can be difficult to distinguish the numbers on top of a police vehicle.

Therefore, there is a need for better identification of emergency response vehicles for being seen from above.

SUMMARY OF THE INVENTION

The present invention is directed to an illuminating numeral lighting system for emergency response vehicles that is able to enhance the visibility of emergency response vehicles to those in the air, such as in helicopters.

The illuminated lighting system provides indicia, in the form of illuminated letters or numerals, on the top of the substantially planar surfaces of emergency response vehicles, such as upon the vehicle hoods, cabins and trunks. The size of the indicia may vary depending upon the purpose of the lighting system, and the size of the horizontal surface upon which the indicia is placed. However, preferred letters and numerals have a length greater than one (1) foot and a width greater than one-half (½) foot. More preferably, the letters and numbers have a length of one (1) to five (5) feet and a width of one-half (½) foot to two (2) feet. Still more preferred, the letters and numbers have a length of approximately two (2) feet and a width of one (1) foot.

To provide illumination to the illuminated numerals, power is provided from the vehicle's electrical systems, such as from the vehicle's battery and alternator. The electrical wiring and switching system for the luminescent panels would be readily understood by those skilled in the art and need not be described in detail herein.

The luminescent numerals and letters may be constructed in various manners. As a first example, the luminescent letters and numbers may be made using a light pipe, also known as a light guide, connected to an independent light source. The light source may be any of various available lighting constructions known in the art. For example, the light source may comprise one or more incandescent light bulbs, light emitting diodes, light emitting crystals, etc. Moreover, the light source may produce light which can be selectively varied in color so as to enable the operator to alter the color of the luminescence. For example, the light source may comprise a plurality of diodes with each diode producing different colored light. Selective activation and deactivation of the diodes alone or in combination will produce illumination in different colors.

The light guide may be constructed in various shapes and of various materials such as of lengths of acrylic plastic, polycarbonate, or glass to form the desired letters or numerals for display from the top of a vehicle. Alternatively, the light pipe may be constructed of one or more fiberoptic fibers or cables. The light pipes may also be constructed of one or more different translucent and flourescent colored materials for projecting light of one or more colors. An acceptable colored material includes "scintillating plastic" which is typically an acrylic plastic incorporating different colored flourescent dyes. Preferably, the light guide includes a reflecting bottom layer for directing light upwardly so as to be seen from above.

Where the light guide incorporates fiberoptic cables, the fiberoptic cables are also constructed to project light laterally from their cylindrical exterior as opposed to predominantly from their distal extremities. This can be accomplished by notching, knurling, scratching or in other manners creating flaws in the otherwise smooth exterior cylindrical surface of the fiberoptic cable. These flaws have been found to interrupt the transmission of light along the length of the fiberoptic cable and to transmit light laterally from the exterior surface of the fiberoptic cable, typically opposite the side which has been flawed.

In an additional preferred embodiment of the present invention, the luminescent letters and numbers are constructed of substantially planar electroluminescent (EL) panels. A first EL construction is described in U.S. Pat. No. 5,045,755 issued to Appelberg and assigned to E-Lite Technologies, Inc. which is incorporated herein by reference. The illuminating sheet is a split electrode or parallel plate lamp consisting of a main body sandwiched between first and second conductive layers. Application of an alternating current to the planar sheet provides a luminescent sheet which is formed in the shape of numerals and letters.

An additional preferred electroluminescent panel for producing the luminescent letters and numbers can be obtained from MKS, Inc. located in Bridgeton, N.J., USA under the trademark designation Quantaflex™. The Quantaflex™ material is an electroluminescent lamp including luminescent phosphors embedded in the dielectric medium of a capacitor constructed in the form of a sheet. Electrodes, including at least one translucent electrode, form the top and bottom layers of the Quantaflex™ material. Upon application of an alternating current to the electrodes, the phosphors give off photons producing light in the visible spectrum. An advantage of the Quantaflex™ material is that the phosphors can be selectively encapsulated between the electrode layers of the luminescent sheet so as to selectively produce patterns of light emitted from the luminescent sheet.

In still additional preferred embodiments, the luminescent numbers and letters are constructed of one of the rapidly developing technologies directed to Organic Light Emitting Devices (OLED), Transparent Organic Light Emitting Devices (TOLED), or Flexible Organic Light Emitting Devices (FOLED). Descriptions of these technologies are available to those skilled in the art and need not be described in further detail herein.

In still an additional embodiment illustrated, the luminescent letters and numerals are provided by a panel including dozens or hundreds of rows and columns of LEDs or the like which can be selectably illuminated to form a desired indicia. For this embodiment, it is preferred that the LEDs are connected by wires to a controllable switching system, which in turn is connected to a computer processor or the like. The computer processor, in turn, includes an input device such as a keyboard or control panel to allow controlled independent illumination of selected LEDs to form the desired indicia. Though more expensive and requiring more complicated wiring and processing capabilities to select appropriate illumination to display desired characters, this embodiment allows for the indicia to be rapidly changed as desired. In an embodiment, these LEDs may produce only infrared light not visible to the human eye and thus only visible through night vision goggles. This alternative method is advantageous when light is not desirable which might alert criminals that police are approaching.

Advantageously, the luminescent numerals and letters may be adhered directly to the roof or top of an emergency response vehicle. However, in an alternative embodiment, a rectangular frame is provided for affixing the luminescent panels to the top of the roof of emergency response vehicles. Once mounted to the roof of a vehicle, the illuminated numerals and letters are easily visible to those in the air.

Thus, it is an object of the invention to provide a structure for identifying emergency response vehicles from the air, such as by those in planes and helicopters.

Further, it is an object of the present invention to provide an improved vehicular external lighting system capable of operating with a low current draw and able to be simply integrated into an existing vehicle's electrical system.

These and other and more specific objects and advantages of the invention will be apparent to those skilled in the art from the following detailed description taken in conjunction with the drawings.

DETAILED DESCRIPTION OF THE INVENTION

Figure 1:
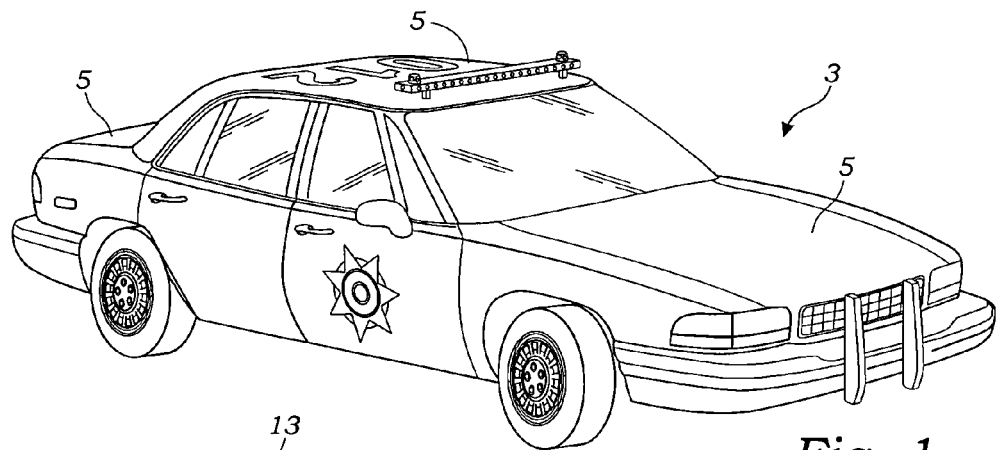
FIG. 1 is a perspective view of an emergency response vehicle equipped with illuminated indica affixed on top of the roof.

While the present invention is susceptible of embodiment in various forms, as shown in the drawings, hereinafter will be described the presently preferred embodiment of the invention with the understanding that the present disclosure is to be considered as an exemplification of the invention, and it is not intended to limit the invention to the specific embodiments illustrated.

With reference to FIGS. 1-10, the present invention is a vehicular illuminated sign 1. The vehicular illuminated sign comprises two primary components including the vehicle 3 and luminescent planar sheet 7. The terms "vehicle" and "luminescent planar sheet" are to be interpreted broadly as to encompass a wide variety of embodiments as would be understood by those skilled in the art. For example, the vehicle 3 is any wheeled vehicle for travel upon the roads and highway of this country including automobiles, trucks, vans, etc. The present invention is intended primarily for emergency response vehicles. However, the invention may have application for identifying trucking fleets and the like. Each of these vehicles have substantially horizontal planar surfaces 5, such as the hood, cabin top, and trunk illustrated in FIGS. 6 and 7.

The luminescent planar sheet 7 of the present invention is mounted upon one or more of the vehicle's horizontal planar surfaces 5. The luminescent planar sheet 7 is mounted substantially horizontally so as to display indicia 9 upwardly. The indicia 9 is in the form of one or more alpha-numeric characters having a length (commonly referred to as a height) and a width. The alpha-numeric characters are provided to identify a vehicle, and thus are preferably unique to that vehicle. The alpha-numeric characters may have any height or width as necessary so as to identify the vehicle from the air. However, the alpha-numeric character preferably has a length greater than 1 ft. and a width greater than 1-0.5 ft. Still more preferably, each of these numbers or letters forming the indicia have a length of approximately 2 ft. and a width of 1 ft.

The luminescent planar sheet is connected to a power system mounted within the vehicle. The power system may be in the form of a battery separate from the vehicle's traditional battery mounted under the hood. However, preferably the illuminated vehicular sign utilizes the power system already provided in a vehicle including the battery and alternator. To control the power to the luminescent planar sheet 7, preferably one or more switches are positioned within the vehicle's cabin so as to control the on or off illumination of the sign. Further, switches may be provided to control the brightness of the illumination and/or color being illuminated. For example, the signage may change colors so as to indicate different events. For example, the luminescent planar sheet may be made to illuminate red in the event of an emergency. Alternatively, the luminescent planar sheet may be made to strobe in the event of an emergency. Switching systems for providing these features can be easily deduced by those skilled in the art and are not described further herein.

Figure 2:
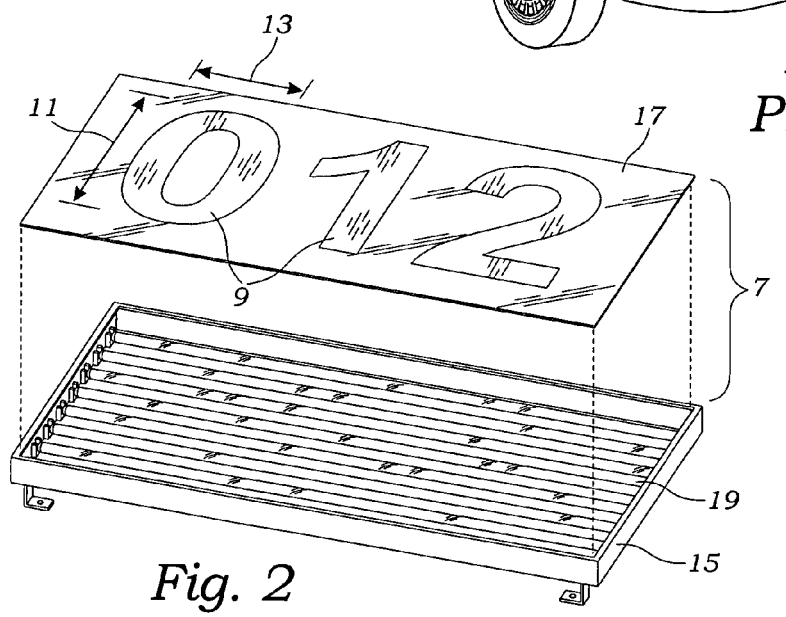
FIG. 2 is a top-exploded view of a frame possessing luminescent panels of the present invention.
Figure 3:
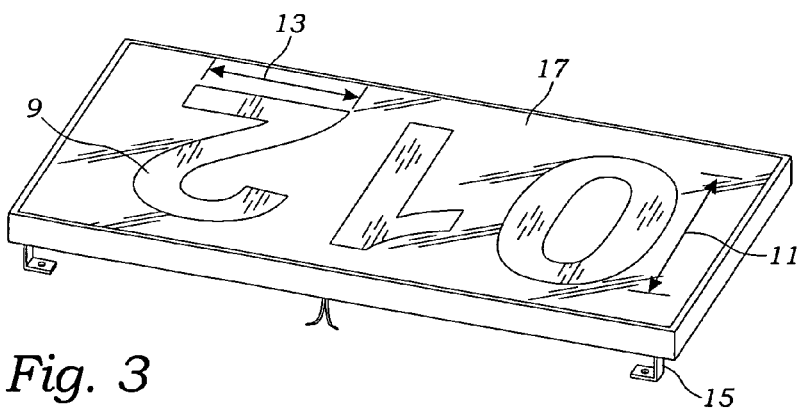
FIG. 3 is a top view of a frame possessing luminescent panels of the present invention.
Figure 4:
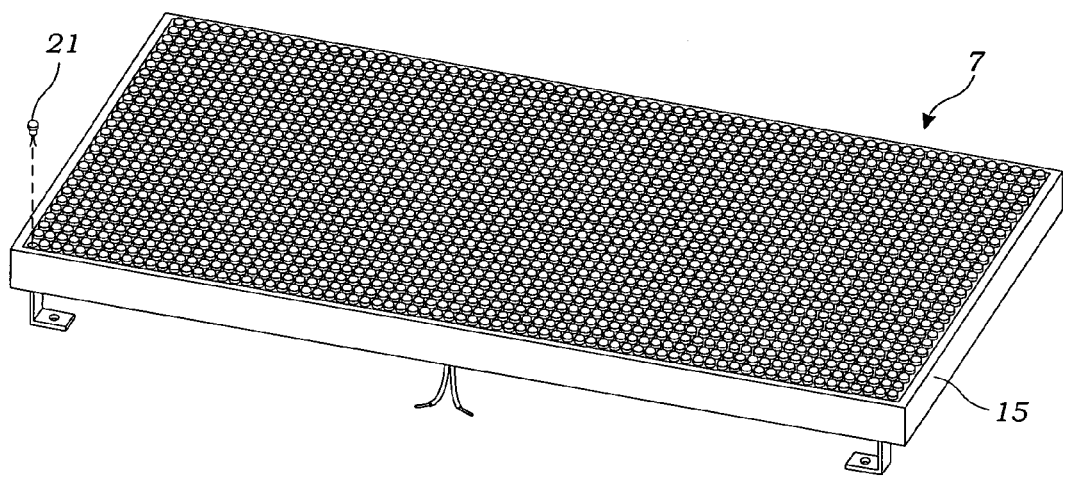
FIG. 4 is a top view of a frame possessing luminescent panels of the present invention possessing LED's.
Figure 5:
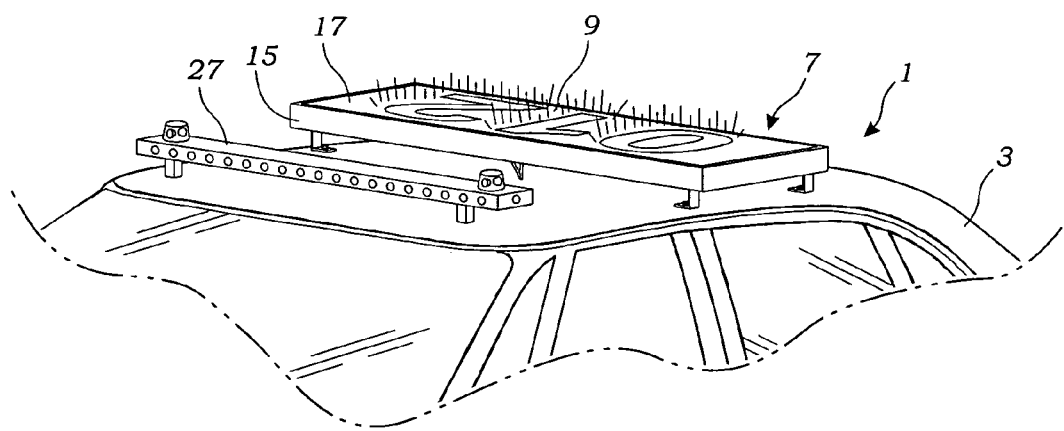
FIG. 5 is a front perspective view of the present invention.
Figure 6:
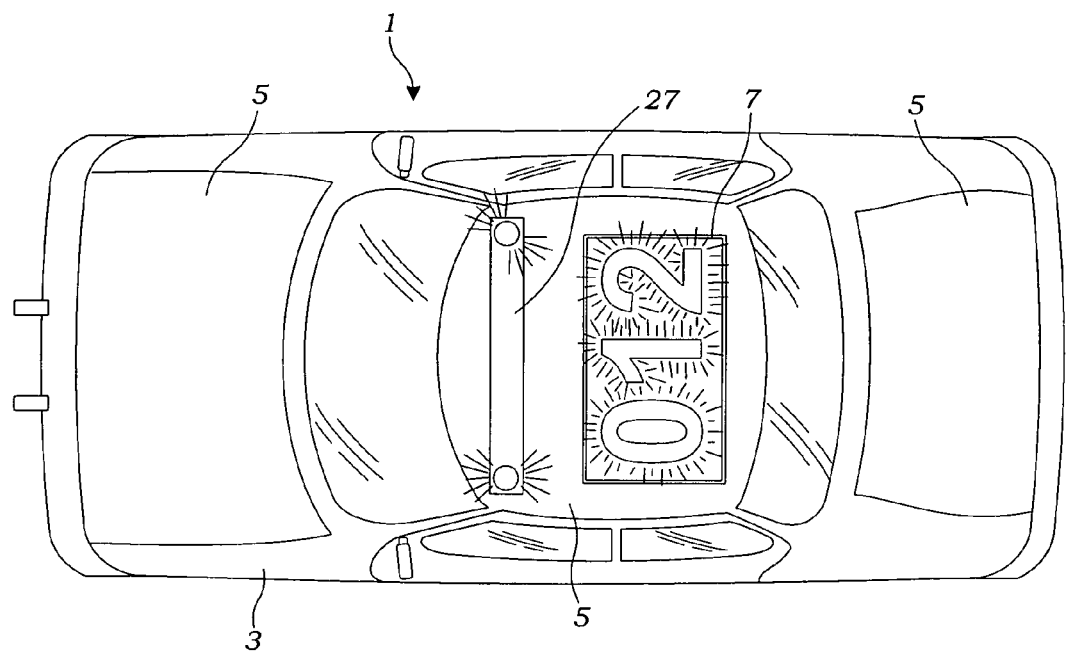
FIG. 6 is a top elevation view of the present invention.
Figure 7:
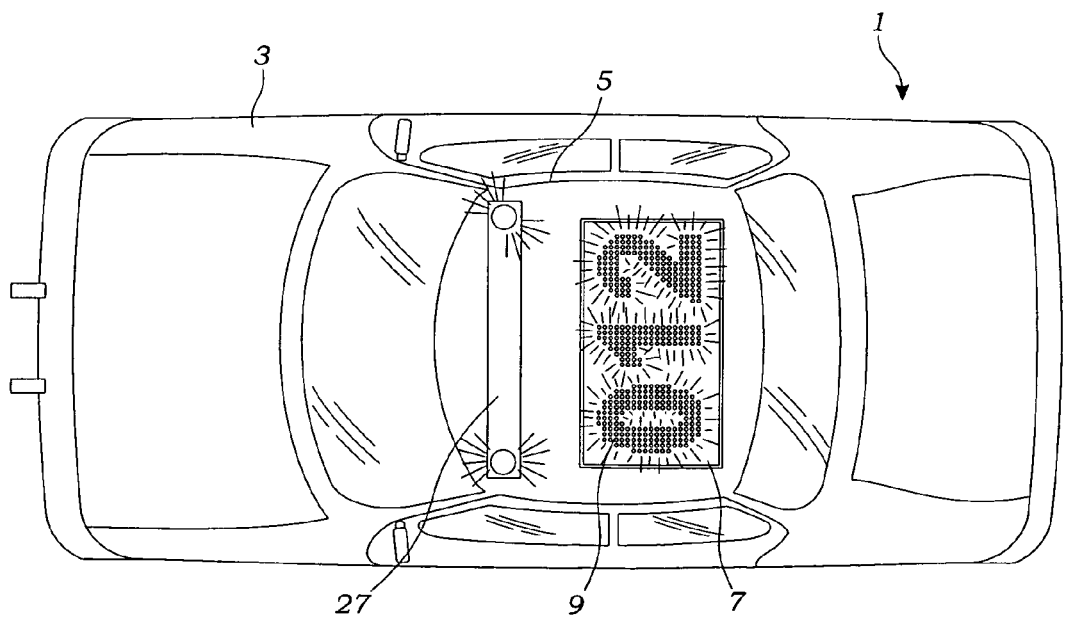
FIG. 7 is a top elevation view an alternative embodiment of the present invention.

As illustrated in FIGS. 2-10, the luminescent planar sheet may be constructed in various manners. As illustrated in FIGS. 2 and 3, in a first embodiment, the luminescent planar sheet comprises a light pipe 17 and an independent light source in the form of florescent bulbs. The light pipe may be made to create opaque alpha-numeric characters with luminescence borders around the alpha-numeric characters. Alternatively, the luminescent planar sheet may be made to create luminescent alpha-numeric characters and an opaque border so as to identify such characters. As illustrated in FIGS. 4 and 5, the luminescent planar sheet may comprise a plurality of LEDs forming the light source which is again covered by a light pipe 17. Again, as illustrated in FIGS. 6 and 7, the indicia may be made to illuminate with an opaque border. Alternatively, the illuminated planar sheet may be made to have opaque indicia with an illuminated border. Where LEDs are employed, the switches controlling activation of the LEDs may be controlled by a computer processor as to form different indicia as desired.

Figure 8:
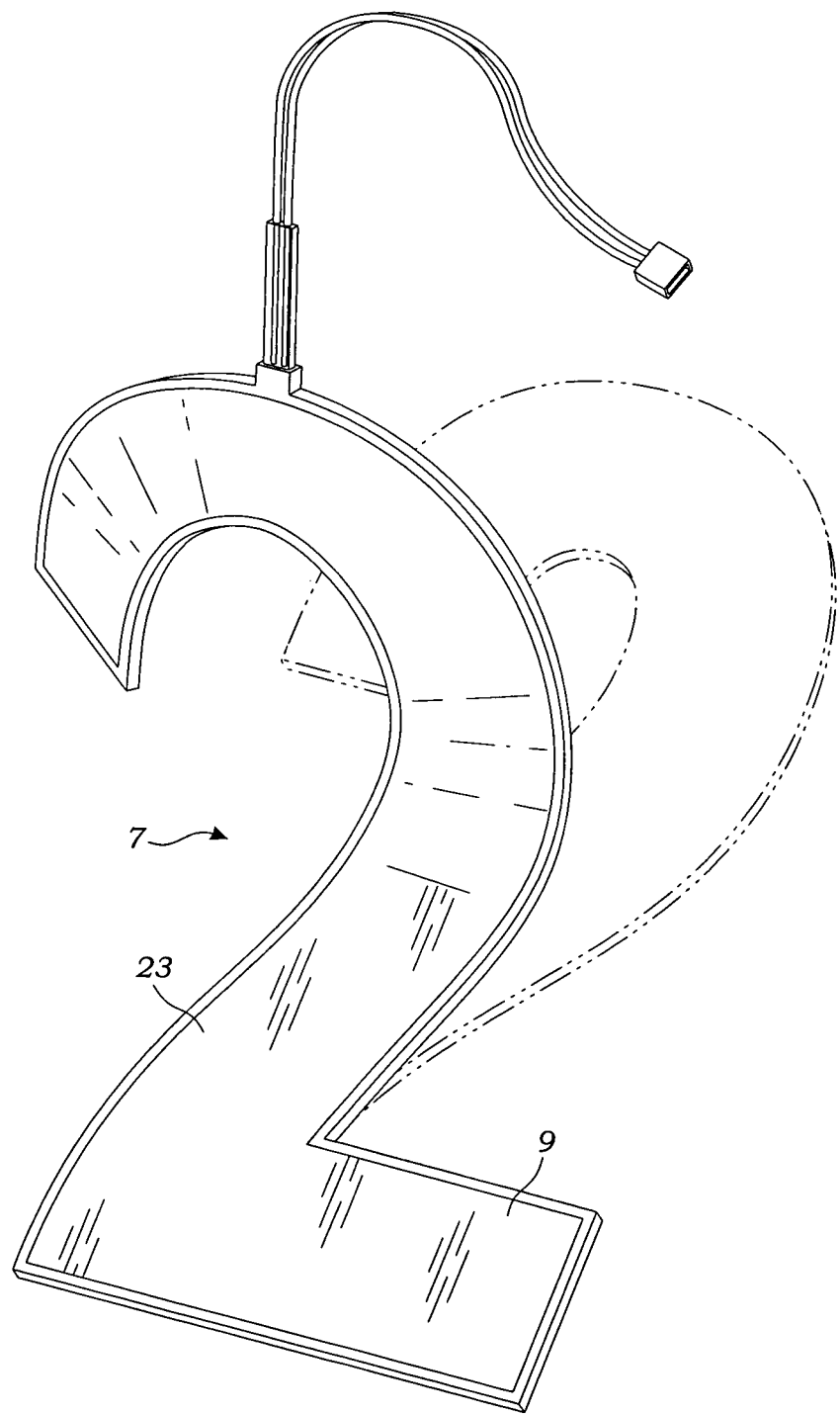
FIG. 8 is a perspective view of illuminated indicia in the form of an electroluminescent panel.
Figure 9:
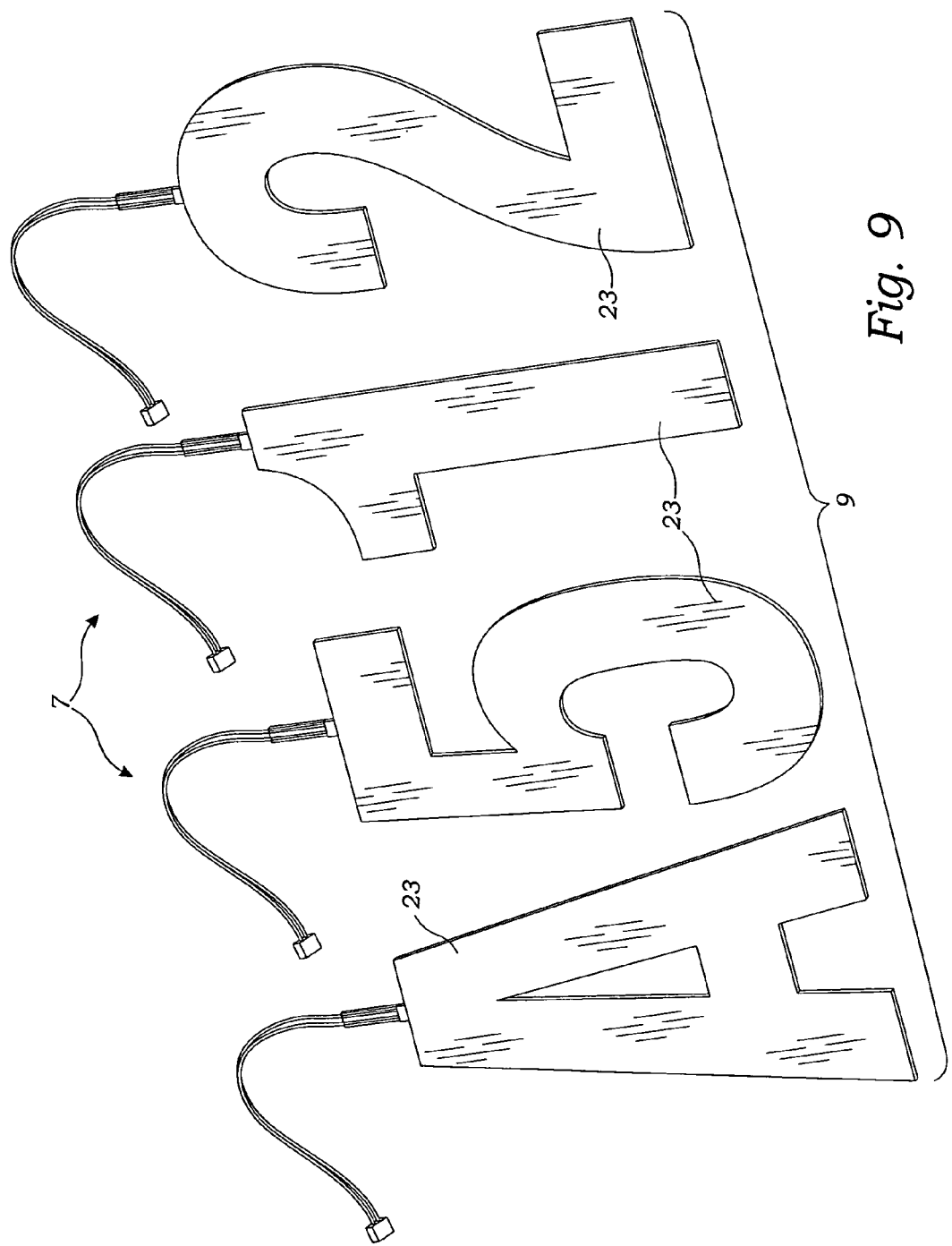
FIG. 9 is a perspective view of illuminated indicia in the form of four electroluminescent panels for identifying an emergency response vehicle.
Figure 10:
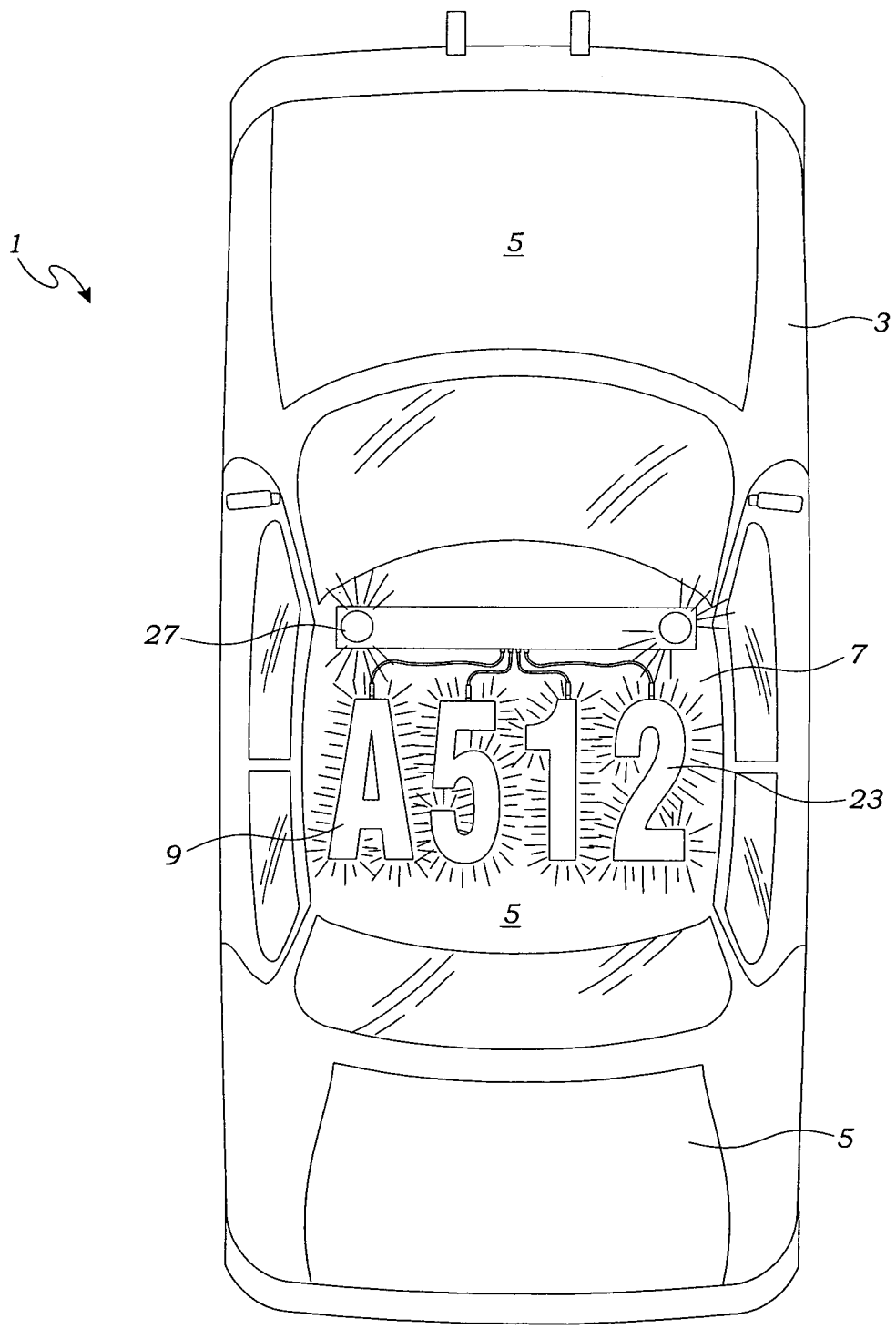
FIG. 10 is a top plan view of illuminated indicia in the form of four electroluminescent panels for identifying an emergency response vehicle.

In still an additional embodiment illustrated in FIGS. 8-10, the luminescent planar sheet 7 is constructed in the form of an electroluminescent (EL) panel lamp. The electroluminescent panels may be constructed in various forms such as described in U.S. Pat. No. 5,045,755. Alternatively, the electroluminescent panels may be constructed of organic light emitting diodes or devices (OLED), transparent organic light emitting devices (TOLED), or flexible organic light emitting devices (FOLED).

Advantageously, where the luminescent planar sheet 7 is constructed in the form of an EL panel, the EL panel can be adhered directly to one of the vehicle's horizontal planar surface 5. Conversely, where the luminescent planar sheet 7 is constructed to include LEDs or light bulbs, the luminescent planar sheet 7 will typically require a frame 15 for holding the light source, as illustrated in FIGS. 2-5. As illustrated in FIG. 10, preferably any wires for supplying power to the luminescent planar sheet can be routed to a vehicle's existing light bar 27.

In still an additional embodiment of the present invention, the luminescent planar sheet is constructed to produce light which is primarily invisible to the human eye such as in the infrared spectrum. The term "primarily invisible to the human eye" is intended to be interpreted broadly because traditional light sources producing light in the infrared spectrum will often produce a minimal amount of light in the visible spectrum. However, as understood by those skilled in the art, such infrared light sources are highly visible when wearing night vision goggles or the like.

While several particular forms of the invention have been illustrated and described, it will be apparent that various modifications can be made without departing from the spirit and scope of the invention. Accordingly, it is not intended that the invention be limited except by the following claims.

I claim:

1. An illuminated vehicular sign comprising:
   a vehicle having four or more wheels, the vehicle having at least one substantially horizontal planar surface in the form of a hood surface, cabin roof surface, or trunk surface;
   one or more luminescent planar sheets mounted upon said horizontal planar surface, said one or more luminescent planar sheets constructed to provide luminescent indicia in the form of one or more letters or numbers which face upwardly so as to be seen from above, said luminescent planar sheets are constructed to selectively illuminate in a plurality of different colors and said plurality of different color includes infrared;
   a power source for providing power to the one or more luminescent planar sheets; and
   a switching system electrically connected to said one or more luminescent planar sheets and said power source for selectively controlling the transfer of power from said power source to said one or more luminescent planar sheets, and for allowing a person to select from said plurality of colors produced by said luminescent planar sheets including the selection of infrared.

2. The illuminated vehicular sign of claim 1 wherein said one or more luminescent planar sheets are electro-luminescent panels wherein said luminescent planar sheets can display infrared light.

3. The illuminated vehicular sign of claim 1 wherein said one or more luminescent planar sheets comprise one or more light pipes connected to light emitting diodes (LEDs) wherein said LEDs can display infrared light.

4. The illuminated vehicular sign of claim 1 wherein said switching system is mounted so as to be easily controllable by a driver.

5. The illuminated vehicular sign of claim 1 wherein said letters or numbers have a length of at least 18 inches.

6. The illuminated vehicular sign of claim 1 wherein said letters or numbers have a length of 18 inches to 48 inches.

7. The illuminated vehicular sign of claim 1 wherein said one or more luminescent planar sheets and said switching system are capable of making said luminescent indicia to strobe, and said switching system allows one to selectively activate or deactivate the strobing indicia.

\* \* \* \* \*